(12) United States Patent
Koike et al.

(10) Patent No.: US 9,860,218 B2
(45) Date of Patent: Jan. 2, 2018

(54) INFORMATION PROCESSING TERMINAL, INFORMATION PROCESSING METHOD, AND INFORMATION PROCESSING SYSTEM

(71) Applicant: KABUSHIKI KAISHA TOSHIBA, Tokyo (JP)

(72) Inventors: Ryuiti Koike, Kanagawa (JP); Mikio Hashimoto, Tokyo (JP); Naoko Yamada, Kanagawa (JP); Ryotaro Hayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 75 days.

(21) Appl. No.: 14/884,022

(22) Filed: Oct. 15, 2015

(65) Prior Publication Data

US 2016/0226843 A1  Aug. 4, 2016

(30) Foreign Application Priority Data

Feb. 2, 2015 (JP) ................................ 2015-018667

(51) Int. Cl.
| | |
|---|---|
| *H04L 29/06* | (2006.01) |
| *G06F 21/57* | (2013.01) |
| *G06F 21/51* | (2013.01) |
| *G06F 21/62* | (2013.01) |
| *G06F 9/445* | (2006.01) |

(52) U.S. Cl.
CPC .............. *H04L 63/06* (2013.01); *G06F 8/65* (2013.01); *G06F 21/51* (2013.01); *G06F 21/575* (2013.01); *G06F 21/6272* (2013.01); *H04L 63/08* (2013.01); *Y02B 60/183* (2013.01)

(58) Field of Classification Search
CPC ....................................................... H04L 63/06
See application file for complete search history.

(56) References Cited

U.S. PATENT DOCUMENTS

| | | | | |
|---|---|---|---|---|
| 2010/0077204 A1* | 3/2010 | Kawano | .................. | H04L 63/06 |
| | | | | 713/153 |
| 2010/0180271 A1* | 7/2010 | Arsenault | ................. | G06F 8/65 |
| | | | | 717/168 |
| 2011/0185196 A1* | 7/2011 | Asano | ................. | B60L 11/1809 |
| | | | | 713/300 |

(Continued)

FOREIGN PATENT DOCUMENTS

| | | |
|---|---|---|
| JP | 3233274 | 11/2001 |
| JP | 2013-69053 | 4/2013 |
| JP | 2014-023036 | 2/2014 |

*Primary Examiner* — Jason C Chiang
(74) *Attorney, Agent, or Firm* — Finnegan, Henderson, Farabow, Garrett & Dunner, L.L.P.

(57) ABSTRACT

A system software unit performs a first authentication operation with an external device using a first key that is registered in advance. A secure software unit determines whether or not system software satisfies a soundness condition. A dedicated memory unit is used to store a second key. While performing a reregistration operation for reregistering the first key, a system software unit requests the secure software unit to read the second key. When the system software satisfies the soundness condition, the secure software unit generates verification data using the second key. When a second authentication operation performed with the external device using the verification data is successful, the system software unit performs the reregistration operation.

16 Claims, 10 Drawing Sheets

(56) References Cited

U.S. PATENT DOCUMENTS

| | | | |
|---|---|---|---|
| 2011/0271110 A1* | 11/2011 | Ohba | H04L 9/0891 |
| | | | 713/168 |
| 2012/0246473 A1* | 9/2012 | Oba | H04L 9/321 |
| | | | 713/168 |
| 2013/0073851 A1 | 3/2013 | Hashimoto et al. | |
| 2013/0111563 A1* | 5/2013 | Chambliss | G06F 21/6236 |
| | | | 726/4 |
| 2013/0230173 A1* | 9/2013 | Hori | G08G 1/092 |
| | | | 380/281 |
| 2013/0254541 A1* | 9/2013 | Yamanaka | H04L 9/0866 |
| | | | 713/168 |
| 2013/0314249 A1* | 11/2013 | Le Buhan | G01D 4/002 |
| | | | 340/870.02 |
| 2014/0025944 A1* | 1/2014 | Maletsky | G06F 21/57 |
| | | | 713/150 |

* cited by examiner

INFORMATION PROCESSING TERMINAL, INFORMATION PROCESSING METHOD, AND INFORMATION PROCESSING SYSTEM

CROSS-REFERENCE TO RELATED APPLICATION

This application is based upon and claims the benefit of priority from Japanese Patent Application No. 2015-018667, filed on Feb. 2, 2015; the entire contents of which are incorporated herein by reference.

FIELD

Embodiments described herein relate generally to an information processing terminal, an information processing method, and an information processing system.

BACKGROUND

In an information processing system that sends and receives information via a network such as the Internet, an authentication operation is performed between communications partners using a private key that is registered in advance.

For example, regarding a signature method using a signature key that is updated based on a verification key and an application ID, in order to enable updating of the signature key in the units of sections such as applications and versions; a device is available that updates the application ID in the units of sections, generates difference information for the purpose of updating the signature key, and updates the signature key based on the updated application IDs and the difference information.

A private key that is used in an authentication operation is constantly subject to danger of being leaked or lost. In case the private key is leaked, it becomes necessary to reregister a new private key. In many cases, the leakage of the private key is attributed to the vulnerability of the system software (firmware) that controls the information processing terminal. In case the system software is likely to have been damaged due to tampering, regardless of whether a private key is reregistered, it is not possible to accept that the confidentiality has been completely recovered. For example, in a system in which a plurality of information processing terminals is connected to a server, in case the system software stored in an information processing terminal is tampered, it is likely that the identification information of that information processing terminal is also tampered. Hence, the server cannot entirely identify the information processing terminal for reregistering the private key. In such a case, a worker needs to visit the installation location of the concerned information processing terminal to deal with the issue. However, particularly if there are a number of information processing terminals, such a task becomes a huge burden in the aspect of labor, cost, and processing time.

DETAILED DESCRIPTION

First Embodiment

Figure 1:
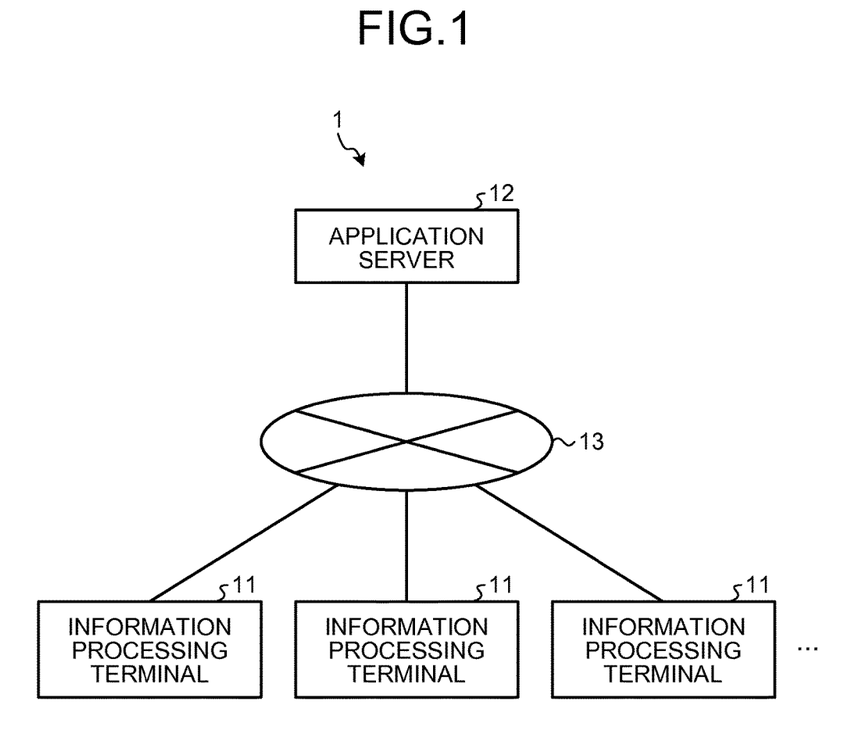
FIG. 1 is a diagram illustrating an information processing system in which information processing terminals according to a first embodiment are used.

FIG. 1 is a diagram illustrating an information processing system 1 in which information processing terminals 11 according to a first embodiment are used. The information processing system 1 includes a plurality of information processing terminals 11, an application server (an external device) 12, and a network 13. Thus, each information processing terminal 11 and the application server 12 are connected via the network 13 such as the Internet.

Suitable examples of the information processing terminals 11 include what is called smart meters. A smart meter is a device having a communication function and a function for transmitting the device usage status (for example, the electricity usage). For example, a smart meter is installed in a physical environment such as the residence of a consumer and enables communication of data with an electric power company. Moreover, a smart meter can be configured to coordinate with a management system that enables controlling the devices in a facility with the aim of achieving energy saving. In that case, either some part of the management system or the entire management system can be treated as the information processing terminal 11. Meanwhile, the information processing terminals 11 are not limited to this example.

The application server 12 is configured using a computer that includes a control device such as a central processing unit (CPU); memory devices such as a read only memory (ROM) and a random access memory (RAM); and input-output devices such as a keyboard, a mouse, and a display. The control device performs predetermined operations according to computer programs stored in the memory devices. The application server 12 performs an authentication operation (described later) to establish connection with the information processing terminals 11, and sends information to and receives information from the information processing terminals 11. Examples of the application server 12 includes a server that receives acquisition information obtained by the information processing terminals 11, and collects and processes the acquisition information for each information processing terminal 11. For example, the acquisition information contains the electricity usage, the gas usage, the water usage, and the usage status of electrical appliances.

The network 13 performs communication using the Internet protocol. Moreover, the network 13 may include wireless access points that are connected to the information processing terminals 11 via wireless links. Furthermore, the network 13 may include other servers that implement different functions than the functions of the application server 12. Examples of other servers include a management server that manages the operation of updating the system software (firmware) of the information processing terminals 11.

Figure 2:
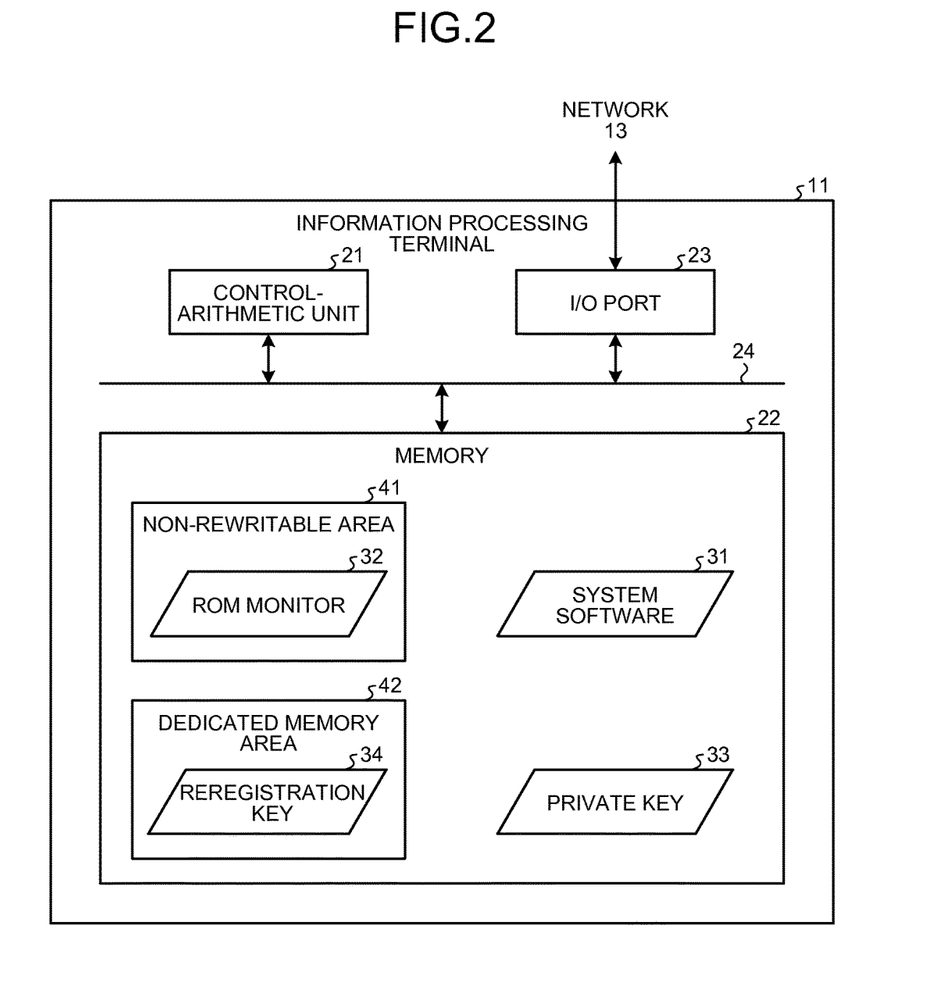
FIG. 2 is a diagram illustrating a hardware configuration of the information processing terminals according to the first embodiment.

FIG. 2 is a diagram illustrating a hardware configuration of the information processing terminals 11 according to the first embodiment. In this example, each information processing terminal 11 includes a control-arithmetic unit 21, a memory 22, an input-output (I/O) port 23, and a bus 24.

The control-arithmetic unit 21 is a circuit for performing predetermined control operations and arithmetic processing according to computer programs stored in the memory 22.

The memory 22 is a nonvolatile memory such as a ROM or a flash memory used to store system software 31, a ROM monitor (secure software) 32, a private key 33, and a reregistration key 34.

The system software 31 and the ROM monitor 32 are computer programs written for controlling the control-arithmetic unit 21. The system software 31 performs overall control of the information processing terminal 11; and controls the authentication operation with the application server 12, controls the operations (such as measurement and communication) during the normal operational condition, controls a registration operation and a reregistration operation with respect to the private key 33, and controls an updating operation for updating the system software 31. Herein, the system software 31 is sometimes referred to as firmware. The ROM monitor 32 controls the booting/rebooting of the information processing terminal 11, controls an operation for determining the soundness of the system software 31, and controls an updating operation for updating the system software 31 at the time of booting.

The private key 33 represents key information used in the authentication operation (a first authentication operation) performed with the application server 12 during the normal operational condition. The reregistration key 34 represents key information used in the authentication operation (a second authentication operation) performed with the application server 12 during a reregistration operation for reregistering the private key 33. The reregistration operation includes destroying the private key 33 that is currently registered in the information processing terminal 11 and the application server 12, and registering a new private key 33. The reregistration operation is mainly performed in the following cases: when the current private key 33 is found to have leaked, when the private key 33 is lost, when the system software 31 is attacked by some malicious software, and when vulnerability is found in the system software 31.

The memory 22 includes a non-rewritable area 41 and a dedicated memory area 42. The non-rewritable area 41 has the ROM monitor 32 stored therein. The dedicated memory area 42 is accessible only during the operations performed by the ROM monitor 32. Moreover, the dedicated memory area 42 has the reregistration key 34 stored therein. Meanwhile, the non-rewritable area 41 can be implemented either by using a physically non-rewritable medium (such as a mask ROM) or by performing access control with respect to a writable medium (such as a flash).

Figure 3:
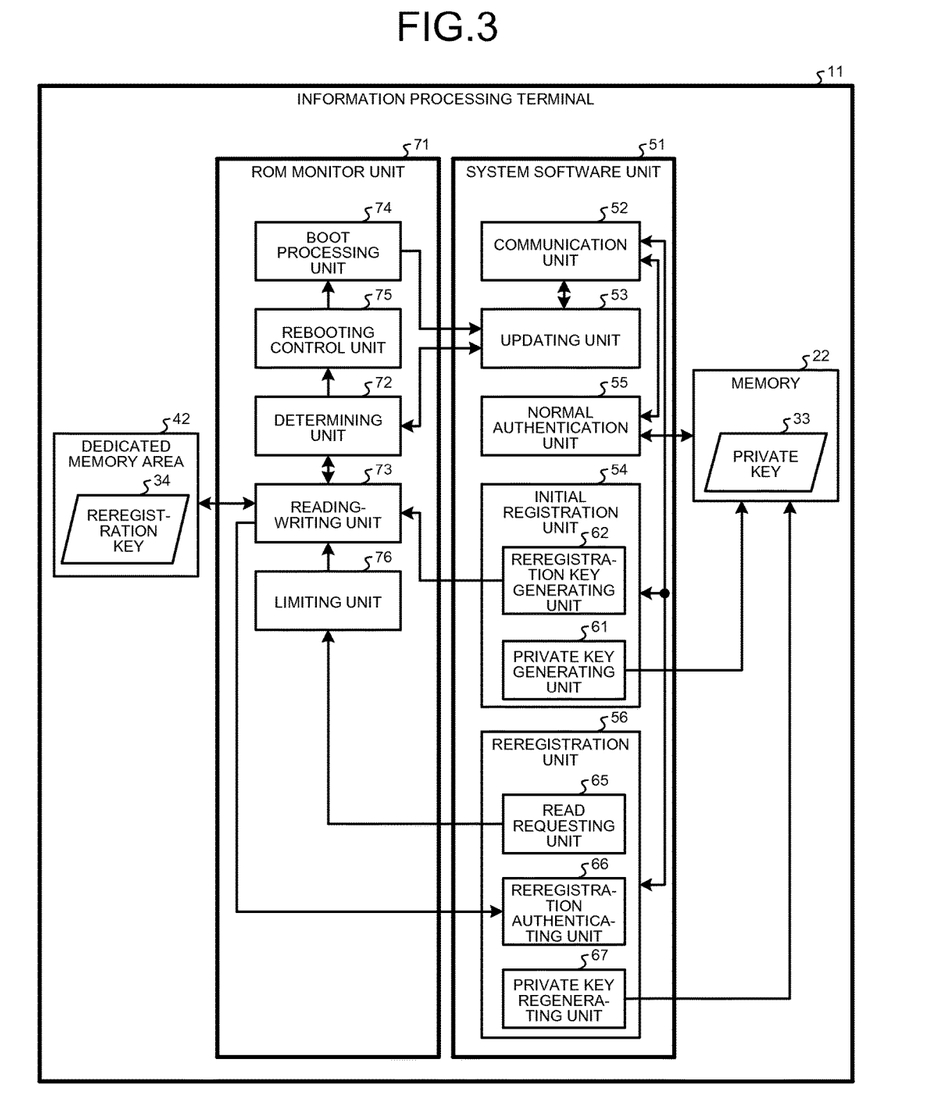
FIG. 3 is a diagram illustrating a functional configuration of the information processing terminals according to the first embodiment.

FIG. 3 is a diagram illustrating a functional configuration of the information processing terminals 11 according to the first embodiment. In this example, each information processing terminal 11 includes a system software unit 51 and a ROM monitor unit (a secure software unit) 71. The system software unit 51 is implemented when the control-arithmetic unit 21 performs operations according to the system software 31 stored in the memory 22. The ROM monitor unit 71 is implemented when the control-arithmetic unit 21 performs operations according to the ROM monitor 32 stored in the non-rewritable area 41 of the memory 22.

The system software unit 51 further includes a communication unit 52, an updating unit 53, an initial registration unit 54, a normal authentication unit 55, and a reregistration unit 56.

The communication unit 52 establishes connection with the network 13, and sends information to and receives information from the application server 12.

The updating unit 53 performs operations related to the updating of the system software 31. More particularly, the updating unit 53 performs the following operations: recognizing the current version of the system software 31; recognizing the latest version provided in the management server that is installed for the system software 31 in the network 13 or recognizing a specified version that is specified by the application server 12; downloading the system software 31 of the latest version or the specified version; and installing the downloaded system software 31.

During the initial booting of the information processing terminal 11, the initial registration unit 54 performs operations for registering the private key 33 and the reregistration key 34 in the information processing terminal 11 and the application server 12. The initial registration unit 54 includes a private key generating unit 61 and a reregistration key generating unit 62. The private key generating unit 61 generates the private key 33 according to a predetermined method, and stores the private key 33 in the memory 22. The reregistration key generating unit 62 generates the reregistration key 34 according to a predetermined method, and requests a reading-writing unit 73 of the ROM monitor unit 71 (described later) to store the reregistration key 34 in the dedicated memory area 42.

The normal authentication unit 55 makes use of the private key 33 stored in the memory 22 and performs the first authentication operation with the application server 12 during the normal operational condition.

The reregistration unit 56 performs a reregistration operation that includes destroying the current private key 33, generating a new private key 33, storing the new private key 33 in the memory 22, and reregistering the new private key 33 in the application server 12. For example, the reregistration unit 56 performs the reregistration operation when a user performs an input operation to request reregistration of the private key 33 or when the system software 31 or the ROM monitor 32 makes an autonomous decision about reregistration. Herein, the autonomous decision implies, for example, determining whether or not the private key 33 is expired. Meanwhile, the reregistration unit 56 includes a read requesting unit 65, a reregistration authenticating unit 66, and a private key regenerating unit 67. During the reregistration operation, the read requesting unit 65 requests the reading-writing unit 73 of the ROM monitor unit 71 (described later) to read the reregistration key 34 that is stored in the dedicated memory area 42. Then, the reregistration authenticating unit 66 makes use of the reregistration key 34 and performs the second authentication operation with the application server 12. When the second authentication operation is successful, the private key regenerating unit 67 generates a new private key 33, stores it in the memory 22, and reregisters it in the application server 12.

The ROM monitor unit 71 includes a determining unit 72, the reading-writing unit 73, a boot processing unit 74, a rebooting control unit 75, and a limiting unit 76.

The determining unit 72 determines whether or not the system software 31, which controls the system software unit 51, is sound in nature. More particularly, the determining unit 72 determines whether or not the system software 31 satisfies a predetermined soundness condition, which represents a condition serving as the benchmark for determining whether or not the system software 31 is sound. For example, when the system software 31 is either of the latest version or of the specified version that is specified by the application server 12, it can be determined that the soundness condition is satisfied.

When the system software 31 is determined to be sound, the reading-writing unit 73 accesses the dedicated memory area 42. In other words, if the soundness of the system software 31 is not confirmed, the reading-writing unit 73 does not read the reregistration key 34.

The boot processing unit 74 performs a booting operation for booting the information processing terminal 11. The booting operation includes confirming the version of the system software 31 and updating the system software 31.

The rebooting control unit 75 controls the re-execution of the booting operation performed by the boot processing unit 74. If the determining unit 72 does not confirm the soundness of the system software 31 for a predetermined period of time or beyond, then the rebooting control unit 75 forces the boot processing unit 74 to perform the booting operation. Herein, the predetermined period of time can be measured using, for example, a watch dog timer (WDT) circuit.

The limiting unit 76 limits the access requests issued by the system software unit 51 with respect to the dedicated memory area 42. More particularly, when a predetermined limiting condition is satisfied, the limiting unit 76 stops the transmission of read request signals output by the read requesting unit 65 of the system software unit 51 with the aim of reading the reregistration key 34. As far as the limiting condition is concerned, it is desirable to consider a case in which the system software unit 51, which performs operations according to the system software 31 having the identical version, outputs a read request signal for a predetermined number of times or more. For example, if a read request signal is output more than once from the system software 31 having the identical version, the transmission of the read request signals output from the second time onward is blocked from reaching the reading-writing unit 73.

Figure 4:
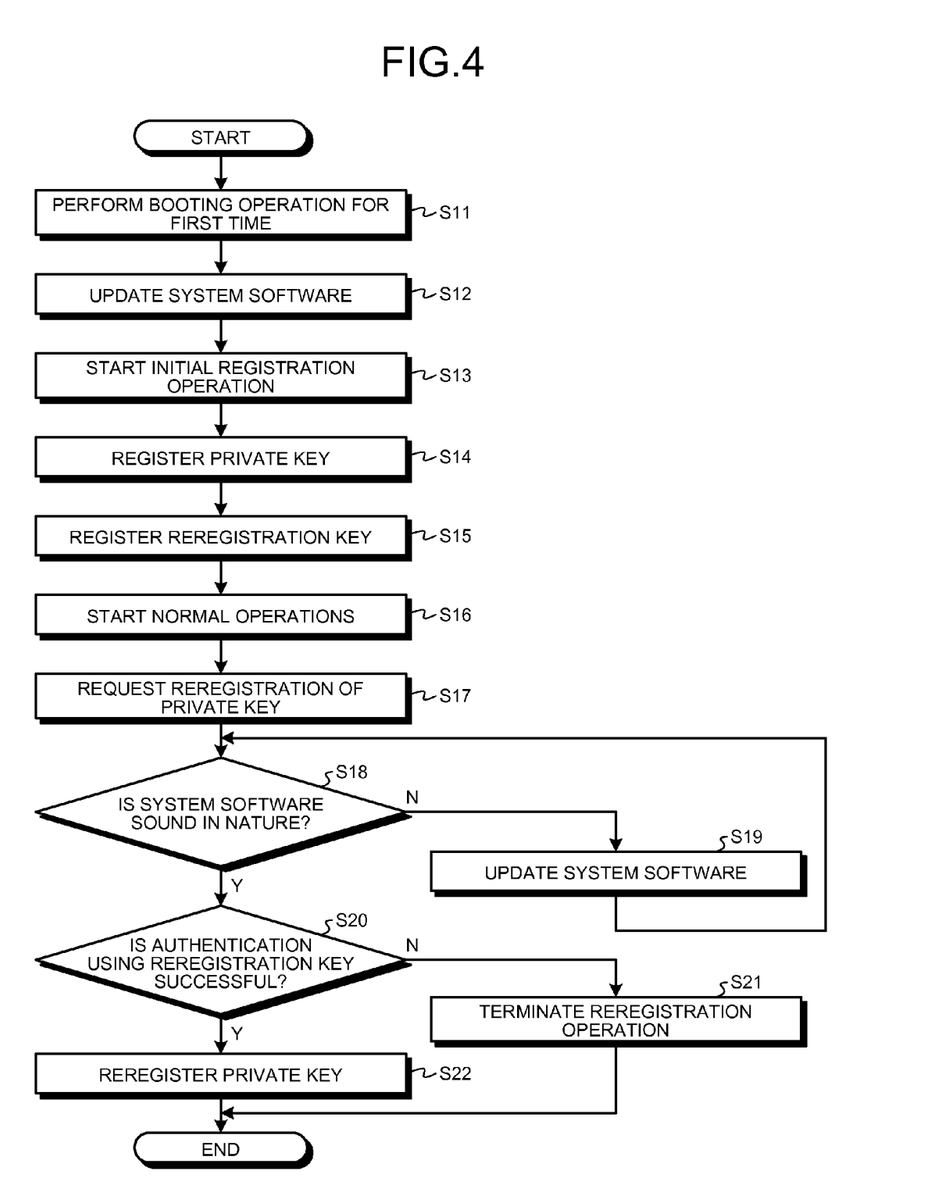
FIG. 4 is a flowchart for explaining the operations performed by the information processing terminals according to the first embodiment.

FIG. 4 is a flowchart for explaining the operations performed by the information processing terminals according to the first embodiment. When each information processing terminal 11 establishes connection with the network 13, and when the boot processing unit 74 of the ROM monitor unit 71 performs the booting operation for the first time (S11), the system software 31 is updated to the latest version (S12).

Then, the initial registration unit 54 of the system software unit 51 performs the initial registration operation (S13), so that the private key 33 is registered (S14) and the reregistration key 34 is registered (S15). That is, the private key 33 generated by the private key regenerating unit 61 is stored in the memory 22 as well as is sent to the application server 12 via the communication unit 52. Moreover, the reregistration key 34 generated by the reregistration key generating unit 62 is stored in the dedicated memory area 42 via the ROM monitor unit 71 as well as is sent to the application server 12 via the communication unit 52. At that time, identification information (ID) that enables identification of the information processing terminal 11 is also sent to the application server 12 along with the private key 33 and the reregistration key 34. Thus, the application server 12 stores therein information in which the IDs, the private keys 33, and the reregistration keys 34 are held in a corresponding manner.

Upon completion of the initial registration operation, the normal operations are started (S16). During the normal operational condition, when a request for reregistration of the private key 33 is issued (S17), the determining unit 72 of the ROM monitor unit 71 determines whether or not the system software 31 is sound in nature (S18). More particularly, the read requesting unit 65 of the reregistration unit 56 of the system software unit 51 outputs a signal for requesting reading of the reregistration key 34. In response, the determining unit 72 of the ROM monitor unit 71 determines whether or not the version of the system software 31 satisfies a predetermined condition.

If the system software 31 is determined not to be sound in nature (N at S18), the system software 31 is updated to the latest version (S19). On the other hand, if the system software 31 is determined to be sound in nature (Y at S18), then an authentication operation is performed using the reregistration key 34 read from the dedicated memory area 42, and it is determined whether or not the authentication using the reregistration key 34 is successful (S20).

If the authentication using the reregistration key 34 is not successful (N at S20), then the reregistration operation for reregistering the private key 33 is terminated (S21). On the other hand, if the authentication using the reregistration key 34 is successful (Y at S20), then the reregistration operation for reregistering the private key 33 is performed (S22). More particularly, the private key regenerating unit 67 generates a new private key 33, which is then stored in the memory 22 as well as sent to the application server 12.

Figure 5:
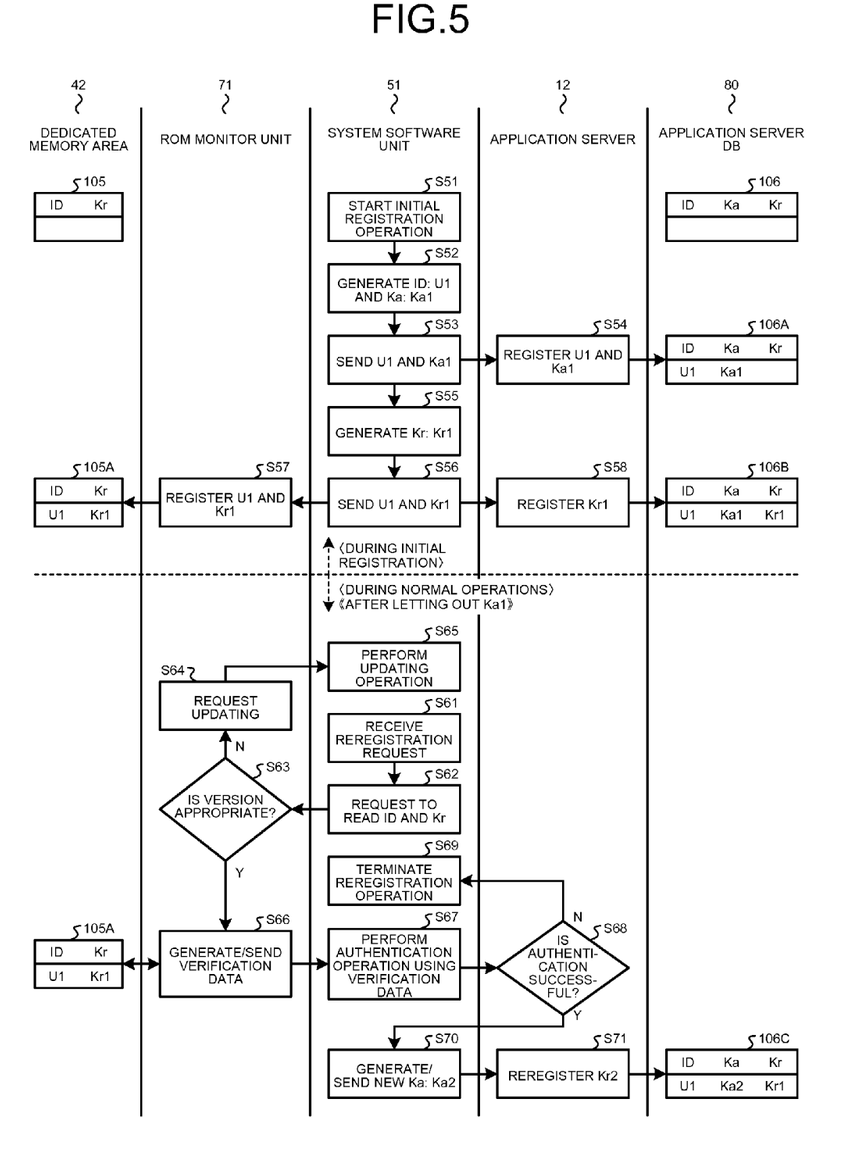
FIG. 5 is a flowchart for explaining the operations performed among the constituent elements of the information processing system according to the first embodiment.

FIG. 5 is a flowchart for explaining the operations performed among the constituent elements of the information processing system 1 according to the first embodiment. Once the initial registration operation is started (S51), the system software unit 51 generates "U1" as identification information ID unique to the information processing terminal 11 and generates "Ka1" as a private key Ka unique to the information processing terminal 11 (S52) and sends the identification information ID: "U1" and the private key Ka: "Ka1" to the application server 12 (S53). Herein, the identification information ID: "U1" and the private key Ka: "Ka1" are stored in the memory 22 of the information processing terminal 11. Alternatively, the identification information ID: "U1" and the private key Ka: "Ka1" can be stored in advance in the memory 22, and can be read therefrom and sent to the application server 12 from the memory 22.

The application server 12 registers the identification information ID: "U1" and the private key Ka: "Ka1" in a table 106 that is provided in a database 80 in the application server 12 (S54). The table 106 indicates the correspondence relationship between the identification information ID, the private key Ka, and a reregistration key Kr. As a result of the operation performed at S54, the identification information ID: "U1" and the private key Ka: "Ka1" are registered in the initial table 106 thereby resulting in the generation of a table 106A.

Then, the system software unit 51 generates "Kr1" as the unique reregistration key Kr (S55), and sends the identification information ID: "U1" and the reregistration key "Kr1" to the application server 12 and the ROM monitor unit 71 (S56). Alternatively, the reregistration key "Kr1" can be stored in advance in the dedicated memory area 42, and can be read therefrom and sent to the application server 12.

The ROM monitor unit 71 registers the identification information ID: "U1" and the reregistration key "Kr1" in a table 105 provided in the dedicated memory area 42 (S57). The table 105 indicates the correspondence relationship between the identification information ID: "U1" and the reregistration key "Kr1". As a result of the operation performed at S57, the identification information ID: "U1" and the reregistration key "Kr1" are registered in the initial table 105 thereby resulting in the generation of a table 105A.

The application server 12 receives the identification information ID: "U1" and the reregistration key "Kr1", and additionally registers the reregistration key "Kr1" in the table 106A (S58). That results in the generation of a table 106B.

Once the initial registration operation from Steps S51 to S58 is completed, the normal operations are started. During the normal operational condition, the first authentication operation is performed with the application server 12 using the identification information ID: "U1" and the private key Ka: "Ka1" generated at S52, and then predetermined normal operations are performed.

During the normal operational condition, if the private key Ka gets leaked, or if there is an attack by some malicious software, or if the private key Ka expires; then a request for reregistration of the private key Ka is issued. For example, the reregistration request can be issued in response to an input operation of the user, or an autonomous decision by the system software 31 or the ROM monitor 32, or reception of a request signal from the application server 12. Upon receiving the reregistration request (S61), the system software unit 51 requests the ROM monitor unit 71 to read the identification information ID and the reregistration key Kr (S62). Herein, the read request represents, for example, a signature request message that requests for the signature of the reregistration key Kr (Kr1) issued with respect to a particular identification information ID (U1).

Upon receiving the read request, the ROM monitor unit 71 determines whether or not the version of the system software 31 is appropriate (S63). This determination can be performed by determining whether the system software 31 is of the latest version or of the specified version that is specified by the application server 12. If the version is not appropriate (N at S63), then the ROM monitor unit 71 requests updating of the system software 31 (S64), and the system software unit 51 performs the updating operation (S65). On the other hand, if the version is appropriate (Y at S63), then the ROM monitor unit 71 reads the identification information ID: "U1" and the reregistration key Kr: "Kr1" from the dedicated memory unit 42, generates verification data based on the identification information ID: "U1" and the reregistration key Kr: "Kr1", and sends the verification data to the system software unit 51 (S66). The verification data represents, for example, the data having the signature of the reregistration key Kr: "Kr1" in the signature request message mentioned above.

The system software unit 51 refers to the verification data and accordingly performs the second authentication operation with the application server 12 (S67). In this way, as a result of performing the second authentication operation using the verification data, there is no need to send the reregistration key Kr from the ROM monitor unit 71 directly to the system software unit 51. That enables achieving prevention of leakage of the reregistration key Kr from the system software unit 51. Then, the application server 12 sends the result of the second authentication operation to the system software unit 51 (S68).

If the authentication result indicates failure (N at S68), the system software unit 51 terminates the reregistration operation (S69). On the other hand, if the authentication result indicates success (Y at S68), the system software unit 51 generates a new private key Ka: "Ka2" and sends it to the application server 12 (S70). Then, the application server 12 reregisters the private key Ka: "Ka2" in the table 106B (S71). That results in the generation of a new table 106C.

Figure 6:
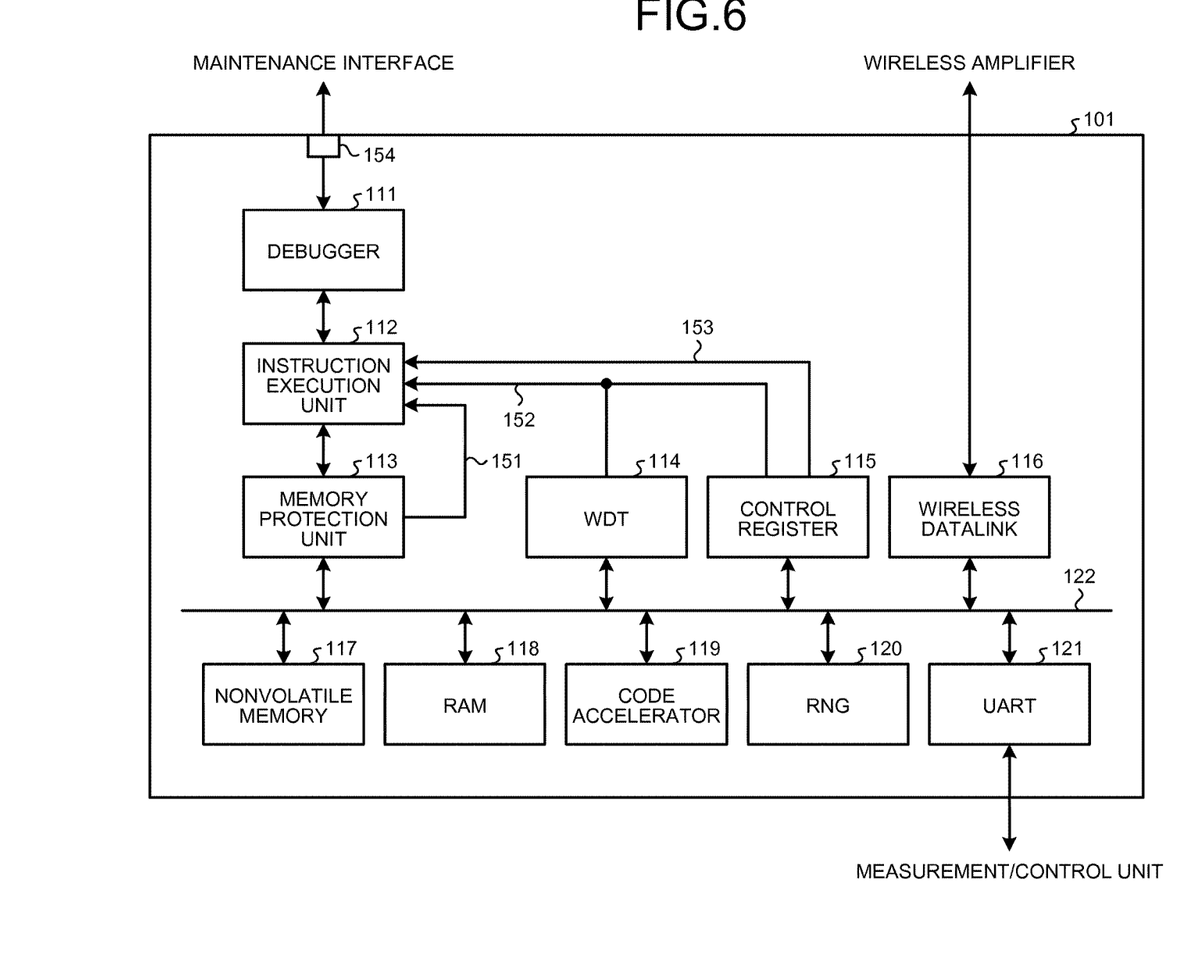
FIG. 6 is a diagram illustrating a configuration of a central processing unit (CPU) embedded in each information processing terminal according to the first embodiment.

FIG. 6 is a diagram illustrating a configuration of a CPU 101 embedded in each information processing terminal 11 according to the first embodiment. This example represents a hardware configuration that more specifically illustrates the configuration illustrated in FIG. 2. Herein, it is assumed that each information processing terminal 11 is configured using an embedded system. The CPU 101 includes a debugger 111, an instruction execution unit 112, a memory protection unit 113, a watch dog timer (WDT) 114, a control register 115, a wireless datalink 116, a nonvolatile memory 117, a RAM 118, a code accelerator 119, a random number generator (RNG) 120, a universal asynchronous receiver transmitter (UART) 121, and a bus 122.

The CPU 101 is connected to a wireless amplifier via the wireless datalink 116. Moreover, the wireless amplifier is connected to an antenna via an external input-output terminal. The antenna sends signals to and receives signals from wireless access points included in the network 13. Meanwhile, the CPU 101 is connected to a measurement/control unit via the UART 121. For example, the measurement/control unit communicates with a wattmeter via an external input-output terminal, measures the power consumption of electrical devices, and transmits the measurement result to the CPU 101. Moreover, the CPU 101 is connected to an external maintenance interface via the debugger 111.

The instruction execution unit 112, which performs various operations according to computer programs (the system software 31 and the ROM monitor 32), is connected to the bus 122 via the memory protection unit 113. Herein, the memory protection unit 113 outputs a signal indicating whether or not an instruction that is input to the instruction execution unit 112 has been issued by the ROM monitor 32 stored in the nonvolatile memory 117. The output signal is then input to the instruction execution unit 112 via a signal line 151.

The memory protection unit 113, the nonvolatile memory 117 (such as a flash memory), the RAM 118, the WDT 114, the control register 115, the wireless datalink 116, the code accelerator 119, the RNG 120, and the UART 121 are connected to the bus 122.

A reset signal representing one of the outputs of the control register 115 and the output of the WDT 114 (a reset signal) are input to the instruction execution unit 112 via a wired OR or via a reset signal line 152. Moreover, an NMI signal (NMI stands for Non Maskerable Interrupt) representing another output of the control register 115 is input to the instruction execution unit 112 via an NMI signal line 153.

The debugger 111 is directly connected to the instruction execution unit 112, and is connected to a maintenance interface via a debug port 154.

Figure 7:
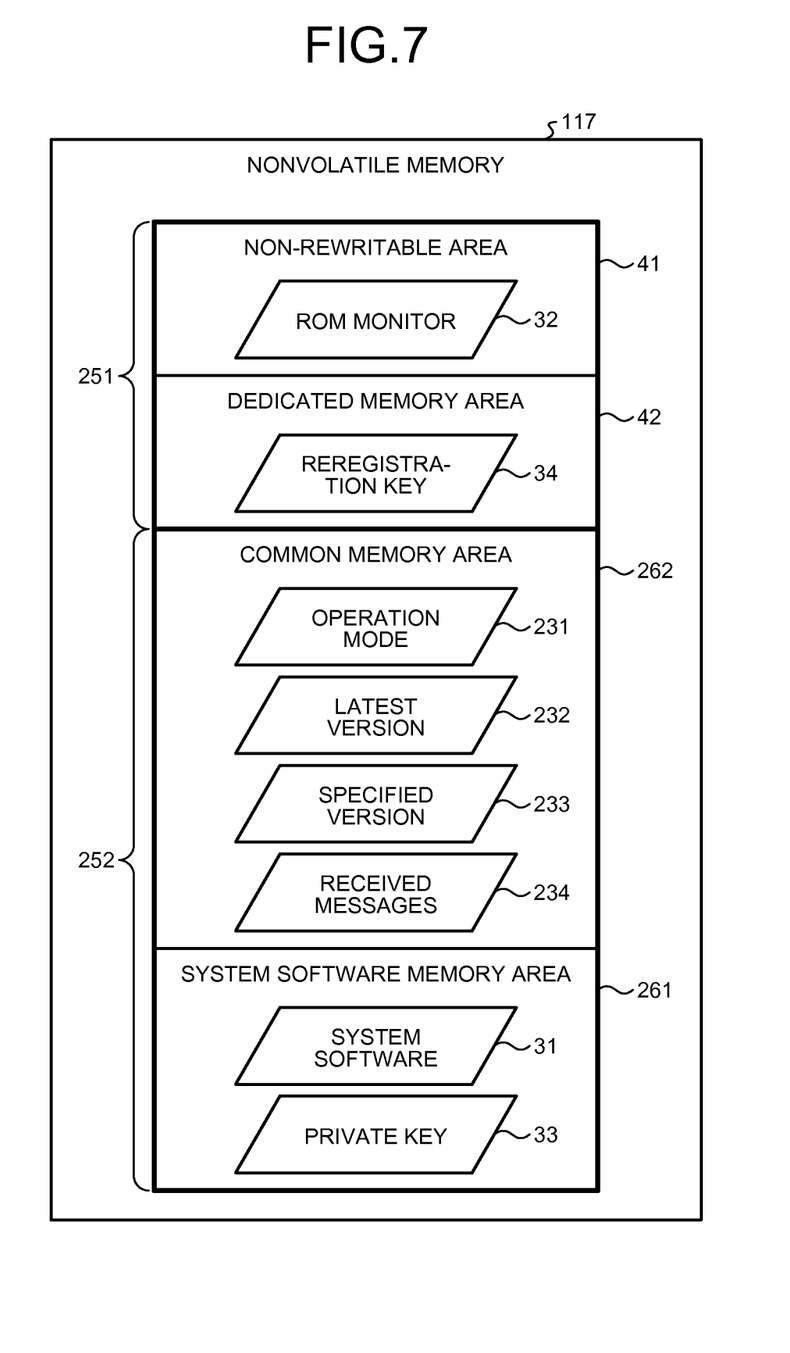
FIG. 7 is a diagram illustrating a configuration of a nonvolatile memory illustrated in the example in FIG. 6.

FIG. 7 is a diagram illustrating a configuration of the nonvolatile memory 117 illustrated in the example in FIG. 6. The nonvolatile memory 117 includes a ROM-monitor dedicated area 251 and a system software area 252.

The ROM-monitor dedicated area 251 includes the non-rewritable area 41 and the dedicated memory area 42. The non-rewritable area 41 desirably has a configuration that physically disallows rewriting of the information stored therein. The non-rewritable area 41 has the ROM monitor 32 stored therein. The dedicated memory area 42 is accessible only during the instruction execution performed by the ROM monitor 32. Moreover, the dedicated memory area 42 has the reregistration key 34 stored therein. Meanwhile, the dedicated memory area 42 can be a readable-writable area or can be a read-only area once the reregistration key 34 is written therein.

The system software area 252 is a readable-writable area that includes a system software memory area 261 and a common memory area 262. In the system software area 252, the already-verified system software 31 and the private key 33 are stored. The system software 31 controls the operation of sending messages to and receiving messages from a management server for managing the updates of the system software 31; controls the operation of downloading the latest system software 31 or the specified system software 31 from the management server; and predetermined normal operations (such as notifying the electricity usage) with the application server 12.

The common memory area 262 is accessible from the system software 31 as well as from the ROM monitor 32. In the common memory area 262 is stored operation mode information 231, latest version information 232, specified version information 233, and received messages 234. The operation mode information 231 indicates the operations being currently performed in the information processing terminal 11. For example, the operation mode information 231 switches between the initial registration mode, the normal operation mode, and the private key reregistration mode. The latest version information 232 indicates the latest version of the system software 31 and, for example, can be provided from the management server mentioned above. The specified version information 233 indicates the version of the system software 31 which is particularly suitable for the use and, for example, can be provided from the application server 12. For example, the specified version information 233 is useful in the case in which the latest version has some issues and an older version is suitable for the use. The received messages 234 represent messages received from the application server 12 and the management server, and can include a variety of information impacting the operations performed by the system software 31 and the ROM monitor 32.

Figure 8:
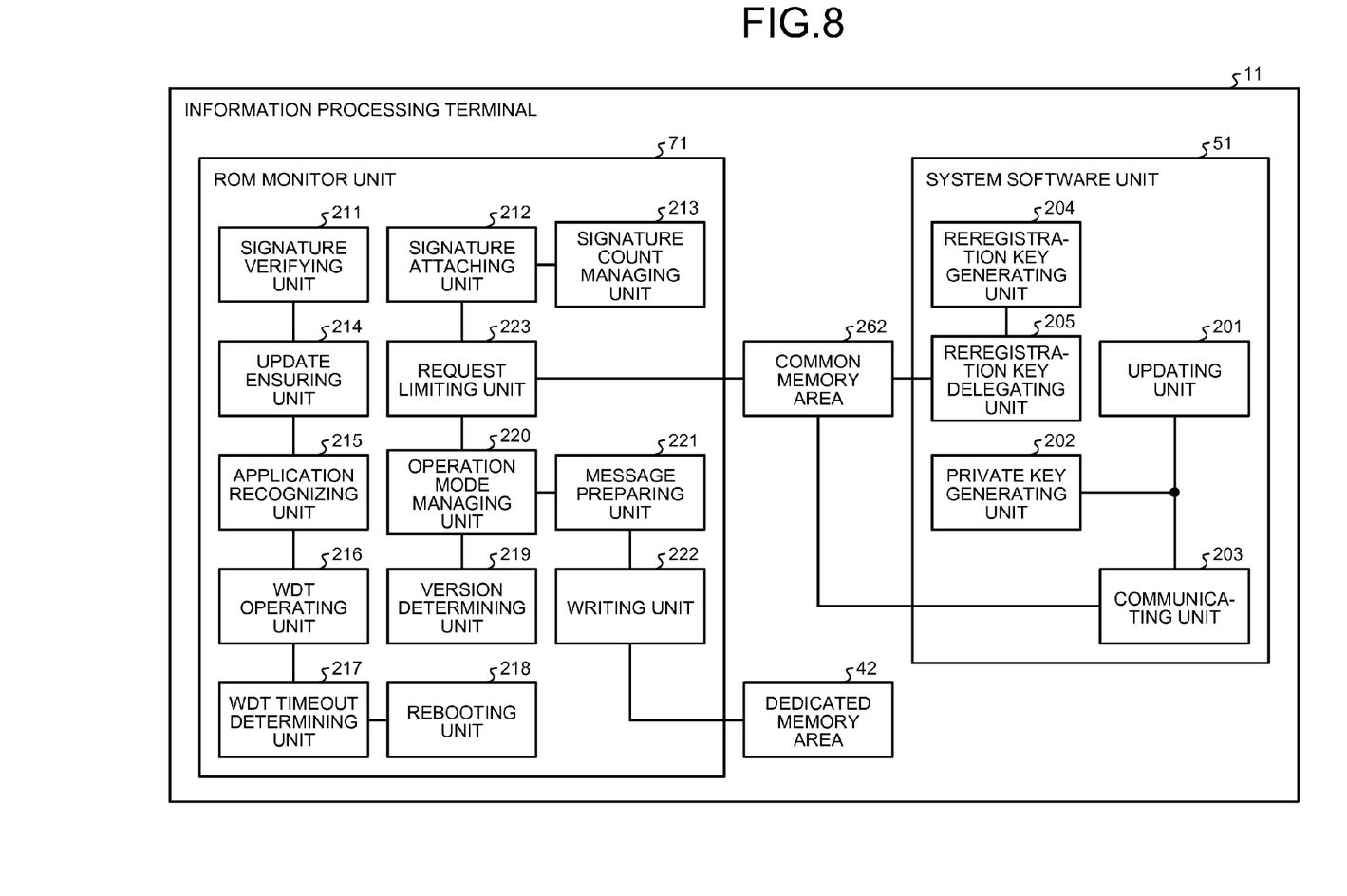
FIG. 8 is a diagram illustrating a functional configuration of the information processing terminal illustrated in the example in FIG. 7.

FIG. 8 is a diagram illustrating a functional configuration of the information processing terminal 11 illustrated in the example in FIG. 7. The system software unit 51 includes an updating unit 201, a private key generating unit 202, a communicating unit 203, a reregistration key generating unit 204, and a reregistration key delegating unit 205. In this example, the functional units for performing normal operations are not illustrated.

The updating unit 201 updates the system software 31. The private key generating unit 202 generates the private key 33. The communicating unit 203 sends, to the common memory area 262, the system software 31 of the latest version or of the specified version as obtained by the updating unit 201 and the private key 33 generated by the private key generating unit 202. The reregistration key generating unit 204 generates the reregistration key 34. The reregistration key delegating unit 205 outputs the reregistration key 34 to the common memory area 262, and delegates the ROM monitor unit 71 to store the reregistration key 34 in the dedicated memory area 42. Herein, the private key 33 and the reregistration key 34 can be generated, for example, using the RNG 120 during the initial registration operation.

The ROM monitor unit 71 includes a signature verifying unit 211, a signature attaching unit 212, a signature count managing unit 213, an update ensuring unit 214, an application recognizing unit 215, a WDT operating unit 216, a WDT timeout determining unit 217, a rebooting unit 218, a version determining unit 219, an operation mode managing unit 220, a message preparing unit 221, a writing unit 222, and a request limiting unit 223.

The signature verifying unit 211 performs a signature verifying operation during the second authentication operation performed using the reregistration key 34. The signature attaching unit 212 attaches the signature using the reregistration key 34 during the second authentication operation. The signature count managing unit 213 manages the number of times for which a signature is done using the reregistration key 34, that is, manages the number of times of reregistering the private key 33.

The update ensuring unit 214 performs an operation to ensure that the system software 31 has an appropriate updating status, that is, to ensure that the system software 31 is sound in nature. The application recognizing unit 215 recognizes the applications running in the system software 31. The WDT operating unit 216 counts up the WDT 114. The WDT timeout determining unit 217 determines whether or not the count of the WDT 114 has reached a predetermined number. The rebooting unit 218 forcibly performs a rebooting operation when the count of the WDT 114 reaches a predetermined value. During the rebooting operation, the system software 31 is updated and the soundness thereof is secured.

The version determining unit 219 determines the version of the system software 31. The operation mode managing unit 220 determines the current operation mode (from among the initial registration mode, the normal operation mode, and the private key reregistration mode). The message preparing unit 221 prepares a message indicating the contents to be stored in the dedicated memory area 42. The writing unit 222 writes, in the dedicated memory area 42, the information such as the reregistration key 34 specified in a prepared message.

The request limiting unit 223 limits the requests for the reregistration operation for reregistering the private key 33. For example, in the private key reregistration mode, when the system software 31 requests for the signature using the reregistration key 34, that is, requests for the reregistration of the private key 33 for a predetermined number of times or more, the request limiting unit 223 turns down the subsequent requests. As a result, the reregistration of the private key 33 by the system software 31 of the identical version can be limited to a predetermined number of times (such as only once).

Figure 9:
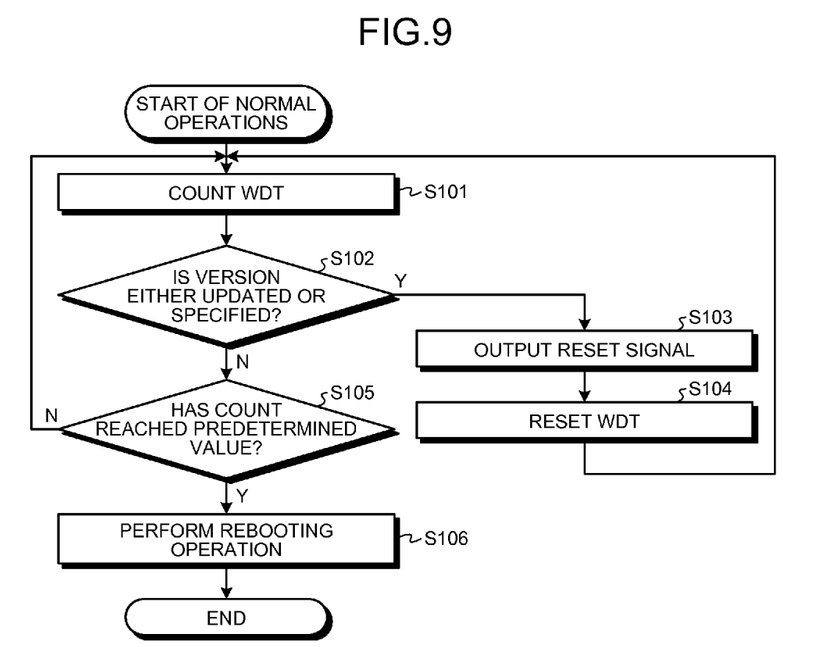
FIG. 9 is a flowchart for explaining a rebooting operation mentioned in the example given with reference to FIG. 8.

FIG. 9 is a flowchart for explaining the rebooting operation mentioned in the example given with reference to FIG. 8. When the normal operations start, the count up of the WDT 114 is performed (S101). Then, it is determined whether or not the system software 31 is of the latest version or of the specified version (S102).

If the system software 31 is determined to be of the latest version or of the specified version (Y at S102), a reset signal is output from the control register 115 (S103) and the count of the WDT 114 is reset (S104).

On the other hand, if the system software 31 is determined not to be of the latest version or of the specified version (N at S102), it is determined whether or not the count of the WDT 114 has reached a predetermined value (S105). If the count of the WDT 114 has reached a predetermined value (Y at S105), the rebooting operation is performed (S106).

According to the first embodiment, the reregistration operation for reregistering the private key 33 is performed after ensuring the soundness of the system software 31 and after performing the second authentication operation using the reregistration key 34 that is handled only by the non-tamperable ROM monitor 32. As a result of performing the second authentication operation using the reregistration key 34, during the reregistration operation for reregistering the private key 33, the application server 12 can reliably determine whether or not the information processing terminal 11 serving as the communications partner is an appropriate partner. Moreover, since the reregistration operation for reregistering the private key 33 is performed by the system software 31 that is ensured to be sound in nature, it is guaranteed to have a reliable recovery of the confidentiality. As a result, recovery of the confidentiality can be done in a reliable and easy manner without having to take efforts such as dispatching a worker to the installation location of the information processing terminal 11.

Modification Example

In the first embodiment, it is the ROM monitor 32 that determines the soundness of the system software 31. Alternatively, secure software that is installed in an USB memory for controlling a control unit can be used in determining the soundness of the system software 31. In that case, the number of times of inserting and removing the USB memory can be treated as the count of the WDT 114.

Second Embodiment

Figure 10:
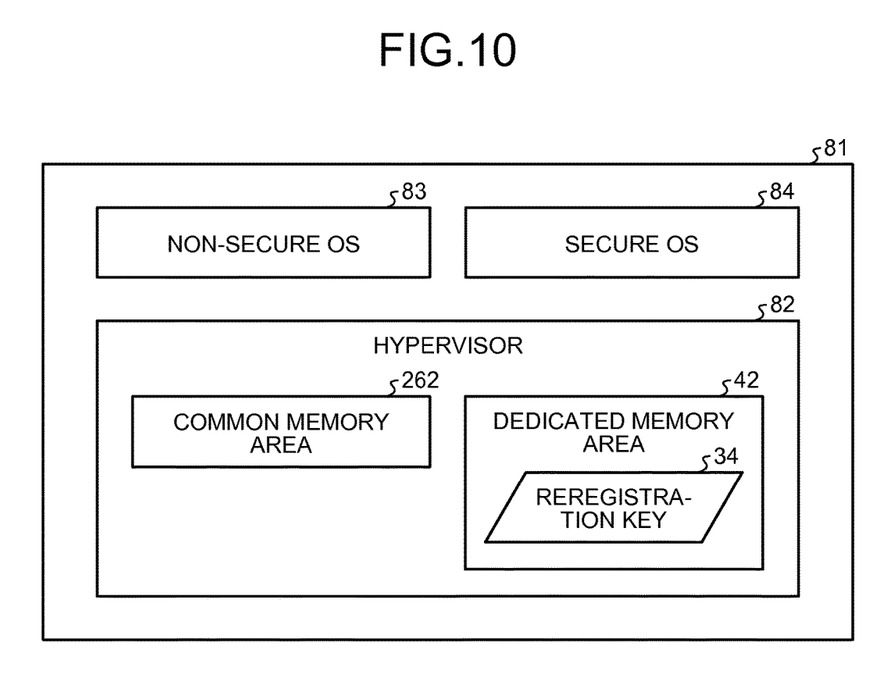
FIG. 10 is a diagram illustrating a configuration of an information processing terminal according to a second embodiment.

FIG. 10 is a diagram illustrating a configuration of an information processing terminal 81 according to a second embodiment. The information processing terminal 11 according to the first embodiment is assumed to be configured using an embedded system. In contrast, the information processing terminal 81 according to the second embodiment is assumed to be configured using a general-purpose computer.

In the information processing terminal 81, a hypervisor 82, a non-secure OS (system software) 83, and a secure OS (secure software) 84 are stored in a memory device; and a CPU performs operations according to the software 82 to 84.

The non-secure OS 83 and the secure OS 84 perform operations in parallel on the hypervisor 82. The non-secure OS 83 has characteristics of being relatively sophisticated with a low level of security; while the secure OS has characteristics of being relatively unsophisticated with a high level of security. The non-secure OS 83 is equivalent to the system software 31 according to the first embodiment, while the secure OS 84 is equivalent to the ROM monitor 32 according to the first embodiment.

The memory device of the information processing terminal 81 includes the dedicated memory area 42 and the common memory area 262 that have identical functions to the first embodiment. Thus, the dedicated memory area 42 has the reregistration key 34 stored therein, and only the secure OS 84 can read the reregistration key 34 from the dedicated memory area 42. The common memory area 262 is accessible from the non-secure OS 83 as well as from the secure OS 84.

In such a configuration too, it is possible to achieve an identical effect to the first embodiment.

Meanwhile, the computer programs that implement the information processing terminals 11, the information processing method, and the information processing system 1 can be stored as installable or executable files in a computer-readable recording medium such as a compact disk read only memory (CD-ROM), a flexible disk (FD), a compact disk recordable (CD-R), and a digital versatile disk (DVD). Alternatively, the computer programs can be downloaded from a predetermined memory device into a predetermined information processing device via a network. Still alternatively, the computer programs can be stored in advance in a ROM and provided to a predetermined information processing device. Meanwhile, the computer programs may include a plurality of modules implementing the functions of the constituent elements described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing terminal comprising:
a system software unit that performs operations according to updatable system software, the operations comprising:
a first authentication operation with an external device using a first key registered in advance, the external device being connected to a network;
a secure software unit that performs operations according to non-rewritable secure software; and
a dedicated memory unit that is accessible only from the secure software unit and stores a second key,
wherein
while performing a reregistration operation for reregistering the first key, the system software unit sends a request for verification data to the secure software unit,
the secure software generates verification data using the second key when the secure software unit determines the system software unit satisfies a predetermined benchmark condition, and
when a second authentication operation performed with the external device using the verification data is successful, the system software unit performs the reregistration operation.

2. The information processing terminal according to claim 1, further comprising a rebooting controller that makes the secure software unit perform a booting operation, which includes updating the system software, when it is determined that the system software does not satisfy the benchmark condition for a redetermined period of time or beyond.

3. The information processing terminal according to claim 2, wherein
when the benchmark condition is determined to be satisfied, the secure software unit outputs a reset signal to the rebooting control unit, and when input of the reset signal is not received until elapse of the predetermined period of time, the rebooting control unit makes the secure software unit perform the rebooting operation.

4. The information processing terminal according to claim 1, further comprising an initial register that performs an initial registration operation for registering, during initial booting, information which contains identification information of the information processing terminal, the first key, and the second key.

5. The information processing terminal according to claim 4, wherein the second key is generated during execution of the initial registration operation and is stored in the dedicated memory unit.

6. The information processing terminal according to claim 1, further comprising a limiting unit that, when a predetermined limiting condition is satisfied, limits execution of the read request operation performed by the system software unit.

7. The information processing terminal according to claim 6, wherein the limiting condition is satisfied when the system software unit performing operations according to the system software of identical version performs the read request operation for a predetermined number of times or more.

8. The information processing terminal according to claim 1, wherein the benchmark condition is satisfied when the system software is of latest version.

9. The information processing terminal according to claim 1, wherein the benchmark condition is satisfied when the system software has a version as specified by the external device.

10. The information processing terminal according to claim 1, wherein
the system software unit includes an output unit that outputs usage information indicating usage status of electrical power, and
the external device is a server that manages electricity usage based on the usage information.

11. The information processing terminal according to claim 1, wherein
the system software unit, the secure software unit, and the dedicated memory unit constitute at least some part of an embedded system, and
the secure software is a ROM monitor stored in a non-rewritable memory area.

12. The information processing terminal according to claim 1, wherein
the system software unit, the secure software unit, and the dedicated memory unit are configured using a general-purpose computer, and
the system software and the secure software are mutually-independent operating systems running in parallel.

13. An information processing method, comprising:
performing, according to updatable system software, a first authentication operation with an external device using a first key which is registered in advance, the external device being connected to a network;
while performing a reregistration operation for reregistering the first key, sending a request for verification data from the system software to non-rewritable secure software;
determining, according to the secure software, whether or not the system software satisfies the benchmark condition;
generating, by the secure software, the verification data using a second key when the secure software determines that the system software satisfies the benchmark condition, the second key being stored in a dedicated memory unit that is accessible only from the secure software;
performing, by the system software, a second authentication operation with the external device using the verification data; and
performing the reregistration operation when the second authentication operation is successful.

14. An information processing system comprising:
an information processing terminal; and
an external device that is connected with the information processing terminal via a network, wherein
the information processing terminal includes
a system software unit that performs operations according to updatable system software, the operations comprising:
a first authentication operation with an external device using a first key registered in advance, the external device being connected to a network;
a secure software unit that performs operations according to non-rewritable secure software, and
a dedicated memory unit that is accessible only from the secure software unit and stores a second key,
wherein
while performing a reregistration operation for reregistering the first key, the system software unit sends a request for verification data to the secure software unit,
the secure software generates verification data using the second key when the secure software unit determines the system software unit satisfies a predetermined benchmark condition, and
when a second authentication operation performed with the external device using the verification data is successful, the system software unit performs the reregistration operation.

15. The information processing system according to claim 14, wherein
a plurality of the information processing terminal performs the first authentication operation with respect to a single of the external device, and
the external device includes a memory unit that manages information about the first key and the second key for identification information of each of the plurality of information processing terminals.

16. The information processing system according to claim 15, wherein
the system software unit includes an output unit that outputs usage information indicating usage status of electrical power, and
the external device is a server that manages electricity usage based on the usage information.

* * * * *